United States Patent [19]
Gahan

[11] Patent Number: 4,799,768
[45] Date of Patent: Jan. 24, 1989

[54] AUTOMATIC REARVIEW MIRROR WITH FILTERED LIGHT SENSORS
[75] Inventor: Edward A. Gahan, Holland, Mich.
[73] Assignee: Donnelly Corporation, Holland, Mich.
[21] Appl. No.: 43,209
[22] Filed: Apr. 27, 1987
[51] Int. Cl.[4] .......................... B60R 1/06; G02B 5/08; G02B 17/00
[52] U.S. Cl. ...................................... 350/279; 350/317
[58] Field of Search ............... 350/279, 283, 317, 637, 350/281; 250/214 B

[56] References Cited
U.S. PATENT DOCUMENTS

| | | |
|---|---|---|
| 3,601,614 | 8/1971 | Platzer, Jr. . |
| 3,612,666 | 10/1971 | Rabinow ............................... 350/279 |
| 3,680,951 | 8/1972 | Jordan et al. ......................... 350/281 |
| 3,722,984 | 3/1973 | Brean ................................... 350/280 |
| 3,746,430 | 7/1973 | Brean et al. .......................... 350/281 |
| 3,807,832 | 4/1974 | Castellion . |
| 3,862,798 | 1/1975 | Hopkins ............................... 350/278 |
| 4,161,653 | 7/1979 | Bedini et al. . |
| 4,200,361 | 4/1980 | Malvano et al. ..................... 350/278 |
| 4,443,057 | 4/1984 | Bauer et al. .......................... 350/281 |
| 4,475,036 | 10/1984 | Bauer et al. . |
| 4,491,390 | 1/1985 | Tong-Shen . |
| 4,512,637 | 4/1985 | Ballmer . |
| 4,529,873 | 7/1985 | Ballmer et al. . |
| 4,572,619 | 2/1986 | Reininger et al. . |
| 4,580,875 | 4/1986 | Bechtel et al. ....................... 350/278 |
| 4,687,926 | 8/1987 | Plummer .............................. 350/317 |

Primary Examiner—John K. Corbin
Assistant Examiner—Rebecca D. Gass
Attorney, Agent, or Firm—Price, Heneveld, Cooper, DeWitt & Litton

[57] ABSTRACT

The specification discloses an automatic rearview mirror which more accurately responds to the glare-reduction needs of the vehicle operator. The mirror includes a reflective element, a light sensor, and a control circuit for regulating the reflective state of the mirror in response to the light sensor. The light sensor includes a detector responsive to electromagnetic wavelengths and a filter for filtering the wavelengths received by the detector so that the spectral response of the light sensor approximates the spectral response of the human eye or standard C.I.E. observer. The light sensor therefore detects the same wavelength intensities as does the vehicle operator.

11 Claims, 2 Drawing Sheets

AUTOMATIC REARVIEW MIRROR WITH FILTERED LIGHT SENSORS

BACKGROUND OF THE INVENTION

The present invention relates to rearview mirrors, and more particularly to rearview mirrors capable of automatically changing their reflective states in response to varying light levels.

High light levels reflected from a rearview mirror into the eyes of a vehicle operator during night driving can seriously impair the operator's forward vision. Light scatters within the eye causing a "veil" or "curtain" of light over the scene. The driver therefore has a reduced ability to detect objects which are dimly lit or have little contrast with the background. This situation is known as disibility glare. The driver is normally unable to detect this loss of visibility since there is no physical sensation associated therewith. At higher reflected light levels, discomfort glare occurs, resulting in an unpleasant physical sensation in the driver's eyes.

Manually actuated rearview mirrors have been developed which include "day" and "night" settings. These day/night mirrors include a mirror prism and a mechanism for changing the angular orientation of the prism. In the "day" setting, the mirror prism is angularly set to provide approximately 80 % reflectance of the rearward mirror image into the driver's eyes. In the "night" setting, the prism is angularly set to provide only approximately 4 % of the full reflectance of the rearward image into the driver's eyes.

Additionally, "automatic" day/night rearview mirrors have been developed which automatically switch the mirror prism between full and partial reflectance states in response to sensed light levels. One such mirror is illustrated in U.S. Pat. No.4,443,057, issued Apr. 17, 1984, to Bauer et al, entitled AUTOMATIC REARVIEW MIRROR FOR AUTOMOTIVE VEHICLES. The Bauer mirror includes a forward light sensor for measuring light in the forward direction, a rear light sensor for measuring light in the rear direction, and a control circuit responsive to the forward and rear light sensors to control the mirror prism. Additional disclosures of automatic day/night rearview mirrors are listed in the Disclosure Statement filed simultaneously herewith.

Known automatic day/night rearview mirrors all suffer a common drawback. Specifically, the light sensors (e.g. photocells, photoresistors, and photodiodes) used in these mirrors have a spectral response to the electromagnetic spectrum which is substantially different from the spectral response of the human eye. Accordingly, the sensitivities of the light sensors to visible and invisible wavelengths are different from the sensitivity of the human eye. Most notably, light sensors are extremely sensitive to infrared and longer wavelengths which cannot be seen by the human eye. Infrared wavelengths are prevalent in artificial lighting and particularly in tungsten filament bulbs. The light sensors detect relatively high light intensities when viewing headlights, taillights, street lights, or any other source of infrared wavelengths. Consequently, the reflective element of a mirror incorporating such sensors is driven to an inappropriate reflective state. The mirror therefore is actuated when not necessary to meet the sensitivity of the human eye and not actuated when necessary to meet the sensitivity of the human eye. Either inadequate image information is presented to the driver and/or excessive glare from the rearview mirror is directed into the driver's eyes.

SUMMARY OF THE INVENTION

The aforementioned problems are overcome in the present invention wherein novel light sensors are provided which have a spectral response closely approximating that of the human eye. Accordingly, the reflective element is controlled in a manner more closely meeting the needs of the human eye to provide an enhanced balance between glare reduction and image information.

More particularly, the present mirror light sensor includes a detector responsive to electromagnetic wavelengths and a filter over said detector for at least partially filtering at least certain invisible wavelengths. The spectral response of the detector and the spectral transmission of the filter are coordinated so that the combined spectral response of the light sensor, including the detector and filter, closely approximates the spectral response of the human eye. Accordingly, the filtered light sensor detects the same wavelength intensities as the driver; and therefore the mirror can be controlled to more closely meet the needs of the human eye.

In a specific embodiment, the detector is a photodiode; and the filter is a band-pass filter which substantially prohibits transmission of infrared and ultraviolet wavelengths. The combined spectral response of the photodiode and filter approximates the C.I.E. mesopic response.

These and other objects, advantages, and features of the invention will be more readily understood and appreciated by reference to the detailed description of the preferred embodiment and the drawings.

DETAILED DESCRIPTION OF THE PREFERRED EMBODIMENT

Figure 1:
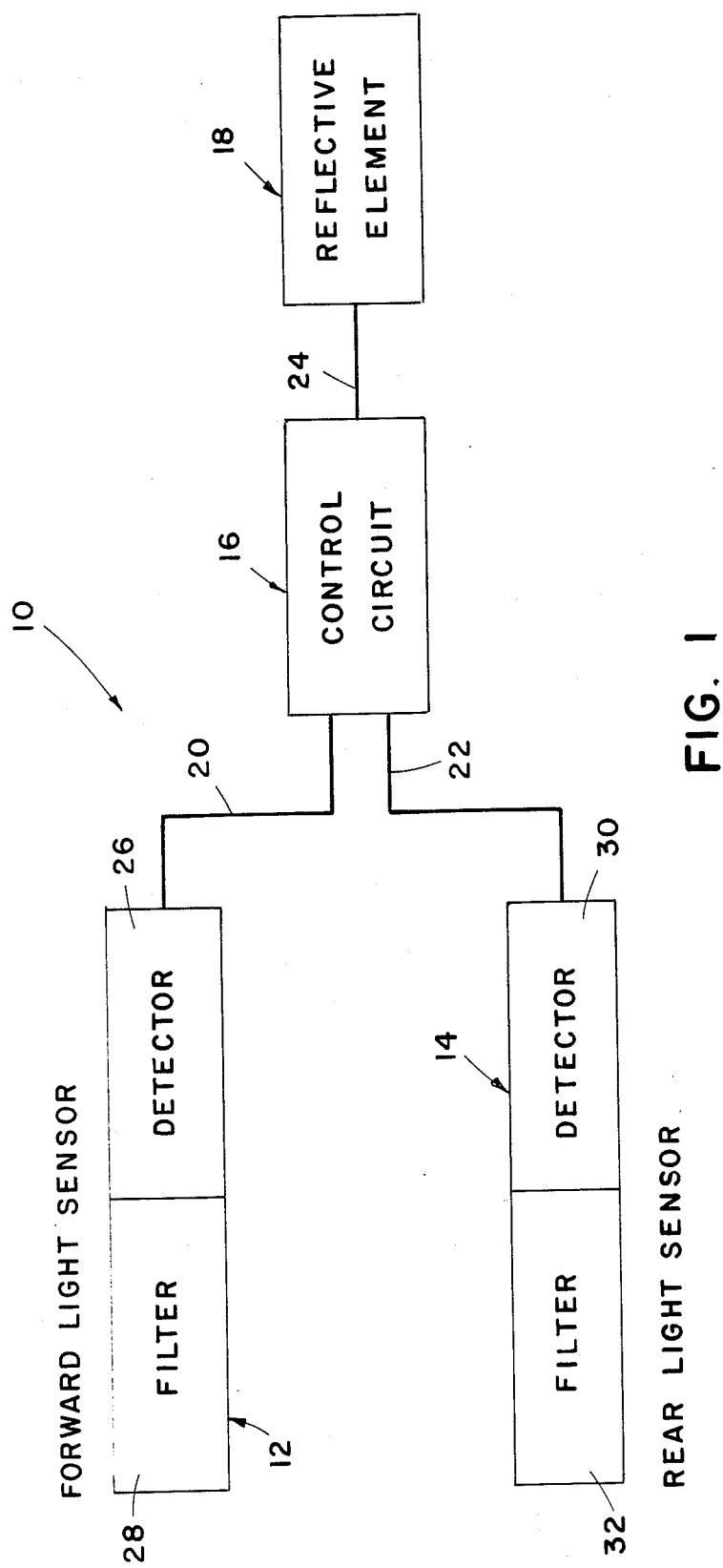
FIG. 1 is a schematic diagram of the automatic rearview mirror of the present invention.

An automatic rearview mirror is schematically illustrated in FIG. 1 and generally designated 10. The mirror generally includes a forward light sensor 12, a rearward light sensor 14, a control/drive circuit 16, and a reflective element 18. The control/drive circuit 16 receives input signals from the sensors 12 and 14 over lines 20 and 22, respectively; and issues a control signal to the reflective element 18 via the line 24. In the preferred embodiment, the control portion of the control/drive circuit 16 is that disclosed in U.S. Application Ser. No. 043,210, filed on even date herewith by Gahan et al, entitled REARVIEW MIRROR CONTROL CIRCUIT, assigned to the assignee of the present application. The forward light sensor 12 includes a detector 26 and a filter 28; and the rear light sensor includes a detector 30 and a filter 32. The associated detectors and filters are selected so that the spectral response of the light sensor (including the detector and filter) closely approximates the spectral response of the human eye. The rearview mirror therefore "sees" approximately the same electromagnetic wavelength intensities as the vehicle driver, enabling the control circuit 16 to control the reflective element 18 to provide a desired balance between image information and glare reduction.

Both the control circuit 16 and the reflective element 18 are generally well known to those having ordinary skill in the art. The reflective element 18 has a plurality of reflective states. The reflective states can be either discretely or continuously varied. An example of a discretely variable element is a mirror prism (such as the well known day/night prism); and an example of a continuously variable reflective element is an electrochromic (EC) cell.

The control circuit 16 receives signals from the sensors 12 and 14 via the lines 20 and 22, respectively. The signals issued by the light sensors are a function of the light directed thereonto. The forward light sensor 12 is arranged to detect light forwardly of the driver; while the rear light sensor is arranged to detect light incident on the reflective surface. The positioning, aiming, and number of the light sensors will vary depending on the application. Based on the relationship of the forward and rear light signals, the control circuit 16 determines the desired state for the reflective element 18 and issues commands via line 24 indicative of the desired state.

A brief discussion of the electromagnetic spectrum will be helpful at this point to clarify the importance of the novel light sensors of the present invention. Visible light comprises one small portion of the electromagnetic spectrum. The segments of this spectrum are typically identified as follows:

| Wavelength (nm) | Description |
| --- | --- |
| 0.00001 to 0.01 | Cosmic rays |
| 0.01 to 0.14 | Gamma rays |
| 0.14 to 12 | X-rays |
| 12 to 380 | Ultraviolet rays |
| 380 to 720 | Visible light |
| 720 to $10^5$ | Infrared rays |
| $10^5$ to $10^{13}$ | Radio waves |
| $10^{13}$ and higher | Electric waves |

The collective reaction of any device or organ to various wavelengths in the electromagnetic spectrum is referred to as that device's or organ's "spectral response".

Figure 2:
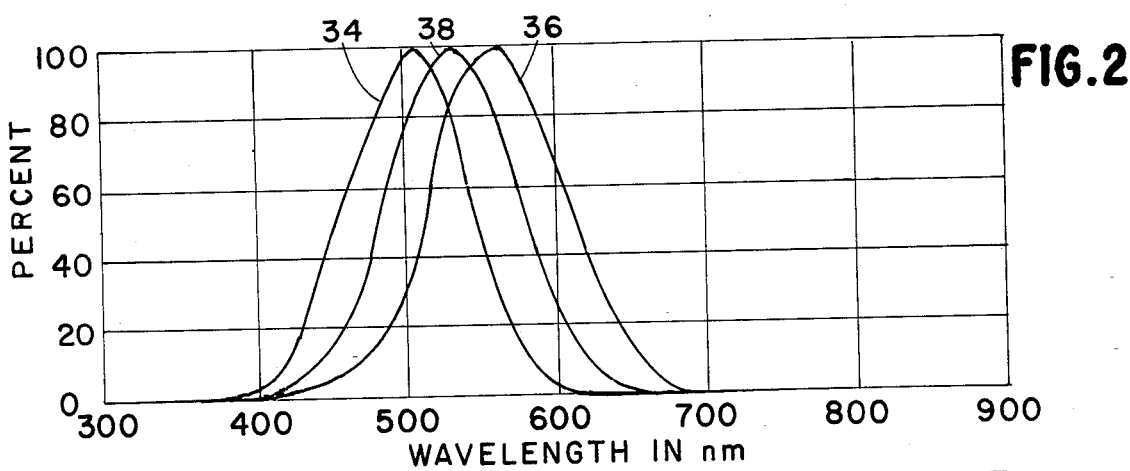
FIG. 2 is a graph illustrating the relative spectral response of the human eye to varying illumination levels.

The human eye is more sensitive to energy submitted at certain wavelengths than at others. The effectiveness of energy emitted at a given wavelength in producing a response in the human eye is indicated by the value of spectral luminous efficiency of the standard C.I.E. observer. This spectral response varies slightly depending on the ambient lighting conditions. Typical human eye spectral responses are illustrated in FIG. 2. The curve 34 represents the spectral response in scotopic conditions—namely less than 0.1 lux with dark-adapted eyes. The curve 36 illustrates the spectral response in photopic conditions—namely greater than 10 lux with light-adapted eyes. Finally, the curve 38, mesopic response, illustrates the spectral response of the eye to mesopic conditions between scotopic and photopic conditions. This curve has a peak at 525 nm and is 50 % at 480 nm and 580 nm.

A significant drawback to known automatic rearview mirrors is that the spectral responses of the light sensors are substantially different from the spectral response of the human eye. Known mirrors therefore detect different light intensities than does the human eye. In particular, known light sensors are extremely sensitive or responsive to infrared and longer wave lengths which are outside of the visible spectrum. Large amounts of infrared light are generated by tungsten filaments such as those used in headlights and taillights. Accordingly, the mirror light sensors are extremely sensitive to these lights, whereas the human eye is not. This causes the mirrors to be actuated in a manner introducing excessive glare into the driver's eyes and/or providing inadequate image information.

Only forward light sensor 12 (FIG. 1) will be described in detail, since rear light sensor 14 is generally identical thereto. The forward light sensor includes a detector 26 and a spectral filter 28.

Figure 3:
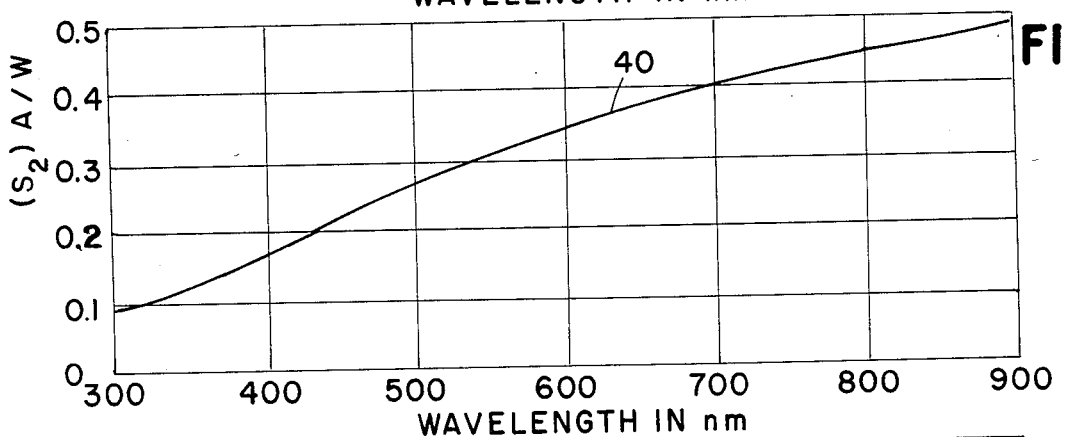
FIG. 3 is a graph illustrating the absolute spectral response of the photodiode used as a light sensor.

In the preferred embodiment, the detector 26 (FIG. 1) is a model VTB Process Number 100 silicon photodiode sold by EG & G Vactec of St. Louis, Missouri. The spectral response of this photodiode is illustrated in FIG. 3, which has a mantissa of identical scale to FIG. 2. A comparison of curve 40 with any of the curves 34, 36, or 38 illustrates that the spectral response of the photodiode is substantially different from the spectral response of the human eye. The spectral response of the photodiode peaks at 900 nm and is 50 % at 500 nm and 1,100 nm. In particular, the spectral response of the photodiode to infrared wavelengths (i.e. 720 nm and higher) is relatively high when compared to the spectral response of the human eye. Such a spectral response is typical of light sensors used in known rearview mirrors.

Figure 4:
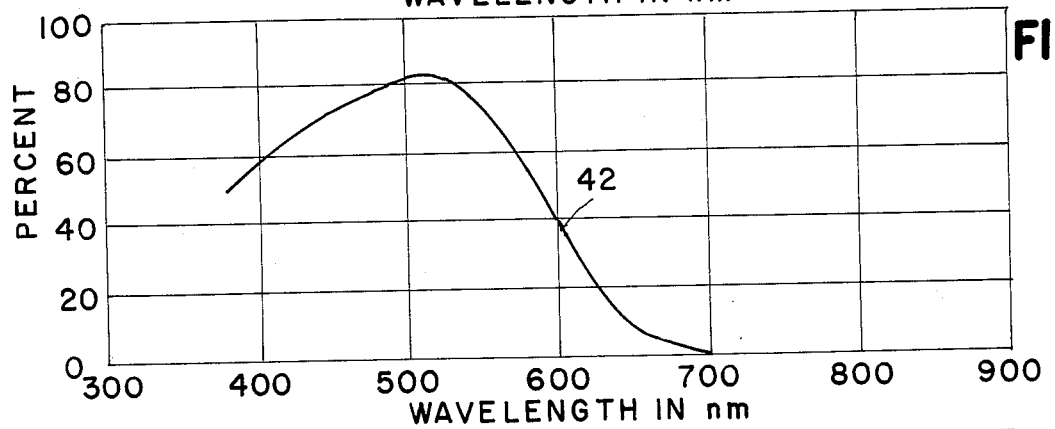
FIG. 4 is a graph illustrating the percent spectral transmission of the filter.

The filter 28 (FIG. 1) is mounted on the detector 26 to filter all electromagnetic wavelengths reaching the detector. The relative spectral transmission of the filter is illustrated as curve 42 in FIG. 4. The preferred filter is that sold as Model BG 18 by Schott Glass of Duryea, PA. The spectral transmission of this filter is illustrated as curve 42 in FIG. 4. The filter substantially prohibits transmission of infrared wavelengths of 720 nm and higher.

Figure 5:
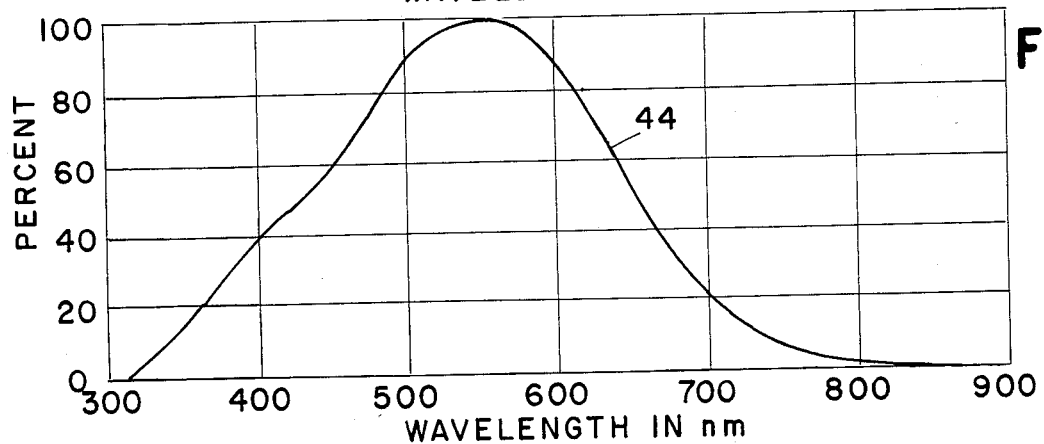
FIG. 5 is a graph illustrating the combined relative spectral response of the diode and filter together.

The combined relative spectral response of the light sensor, including the combined detector 26 and filter 8, is illustrated as curve 44 in FIG. 5. As will be readily appreciated by a comparison of curve 44 and curve 38 (FIG. 2), the relative spectral response of the novel light sensor 12 closely approximates the spectral response of the human eye. Most importantly, the light sensor 12 has relatively little, if any, response to infrared and longer wavelengths. Accordingly, the light sensor is not unduly responsive to artificial lighting such as headlights and taillights which include infrared components. Since the spectral response of the light filter 12 closely approximates the spectral response of the human eye, the light sensor 12 detects the same electromagnetic wavelength intensities as does the human eye. Accordingly, the control circuit 16 (FIG. 1) receives control signals from the forward and rear light sensors 12 and 14 which closely approximate the actual sensitivity of the human eye to the illumination conditions. The calculations of the control circuit 16 more accurately reflect the reflective state desired by the vehicle operator.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents.

The embodiments of the invention in which an exclusive property or privilege is claimed are defined as follows:

1. An automatic rearview mirror comprising:
   a reflective element having a plurality of reflective states;
   light sensor means for outputting a signal responsive to light directed onto said light sensor means, said light sensor means including a detector means for outputting the signal responsive to the intensities of electromagnetic wavelengths received by said detector means and a filter means for filtering the electromagnetic wavelengths reaching said detector means, the spectral response of said detector means and the spectral transmission of said filter means being such that together the spectral response of said light sensor means more closely approximates the spectral response of the human eye than does the unfiltered detector means; and
   a control means responsive to at least the signal for controlling the reflective state of said reflective element.

2. An automatic rearview mirror as defined in claim 1 wherein said filter means substantially prohibits transmission of infrared wavelengths.

3. An automatic rearview mirror as defined in claim 1 wherein the spectral response of the human eye is from approximately 380 nanometers to approximately 720 nanometers.

4. An automatic rearview mirror as defined in claim 1 wherein said detector means comprises a photodiode.

5. An improved automatic rearview mirror for a vehicle, said mirror including a light sensor, a reflective element having a plurality of reflective states, and a control means responsive to said light sensor for controlling the reflective state of said reflective element, the improvement comprising said light sensor comprising:
   sensor means for detecting electromagnetic wavelengths and outputting a signal as a function of the wavelengths; and
   filter means for filtering the wavelengths received by said sensor means and reducing the intensity of at least certain invisible wavelengths to reduce the effect of the invisible wavelengths on the signal.

6. An improved automatic rearview mirror as defined in claim 5 wherein said filter means substantially prohibits transmission of infrared wavelengths.

7. An improved automatic rearview mirror as defined in claim 5 wherein the spectral response of said sensor means and the transmission response of said filter means together produce a spectral response approximating that of the standard C.I.E. observer.

8. An improved automatic rearview mirror as defined in claim 5 wherein said sensor means comprises a photodiode.

9. A method of fabricating an automatic rearview mirror for a vehicle comprising:
   operatively coupling a control system to a reflective element having a plurality of reflective states;
   operatively coupling an electromagnetic wavelength detector to the control system, the detector having a spectral response different from the spectral response of the human eye; and
   operatively coupling a spectral filter to the wavelength detector, the filter being selected so that the filtered detector has a spectral response more closely approximating the spectral response of the human eye than the unfiltered detector.

10. A method as defined in claim 9 wherein the spectral filter substantially prohibits transmission of infrared wavelengths.

11. A method as defined in claim 9 wherein the detector comprises a photodiode.

* * * * *

UNITED STATES PATENT AND TRADEMARK OFFICE
CERTIFICATE OF CORRECTION

PATENT NO. : 4,799,768

DATED : January 24, 1989

INVENTOR(S) : Edward A. Gahan

It is certified that error appears in the above-identified patent and that said Letters Patent is hereby corrected as shown below:

Column 4, line 44:

"8" should be --28--.

Signed and Sealed this

Twelfth Day of June, 1990

*Attest:*

HARRY F. MANBECK, JR.

*Attesting Officer*  *Commissioner of Patents and Trademarks*